(12) United States Patent
Runstedler et al.

(10) Patent No.: US 9,380,167 B2
(45) Date of Patent: Jun. 28, 2016

(54) LIMITING DATA TRANSMISSION TO AND/OR FROM A COMMUNICATION DEVICE AS A DATA TRANSMISSION CAP IS APPROACHED AND GRAPHICAL USER INTERFACE FOR CONFIGURING SAME

(75) Inventors: Christopher James Runstedler, Waterloo (CA); Michael Thomas Hardy, Waterloo (CA); Rohit Rocky Jain, Waterloo (CA); Aaron David Scriver, Waterloo (CA)

(73) Assignee: BlackBerry Limited, Waterloo (CA)

( * ) Notice: Subject to any disclaimer, the term of this patent is extended or adjusted under 35 U.S.C. 154(b) by 807 days.

(21) Appl. No.: 12/331,758

(22) Filed: Dec. 10, 2008

(65) Prior Publication Data

US 2010/0144312 A1 Jun. 10, 2010

(51) Int. Cl.
*H04M 11/00* (2006.01)
*H04M 15/00* (2006.01)
(Continued)

(52) U.S. Cl.
CPC .......... *H04M 15/00* (2013.01); *H04M 15/8005* (2013.01); *H04M 15/81* (2013.01);
(Continued)

(58) Field of Classification Search
CPC . H04L 12/14; H04L 12/1432; H04L 12/1435; H04L 43/16; H04L 12/2602; H04W 4/24; H04W 4/26; H04M 15/846; H04M 15/85; H04M 15/851; H04M 15/852; H04M 15/853; H04M 15/854; H04M 15/858; H04M 15/88; H04M 15/881; H04M 2215/0112; H04M 2215/0116; H04M 2215/012; H04M 2215/2033; H04M 2215/78; H04M 2215/782; H04M 2215/81; H04M 2215/8104; H04M 2215/8129; H04M 2215/8137; H04M 2215/8141; H04M 2215/815; H04M 2215/8158; H04M 2215/8162; H04M 2215/8166; H04M 2215/8183; H04M 2215/82
USPC ................................. 455/405–408, 418–420; 379/114.01–114.29; 709/223–226
See application file for complete search history.

(56) References Cited

U.S. PATENT DOCUMENTS 6,101,531 A * 8/2000 Eggleston et al. ............ 709/220
6,757,529 B2 * 6/2004 Nakajima ..................... 455/407
(Continued)

FOREIGN PATENT DOCUMENTS

GB 2 364 213 A 1/2002

OTHER PUBLICATIONS

Qualcomm Inc.: "Eudora Email 7.1 User Guide for Windows" [online] Sep. 2006, pp. 298-301, XP002517608, Retrieved from the Internet: URL: http://www.eudora.com/download/eudora/windows/7.1/Eudora_71_User_Manual.pdf> [retrieved on Mar. 2, 2009].
(Continued)

*Primary Examiner* — Thai Vu
(74) *Attorney, Agent, or Firm* — Borden Ladner Gervais LLP; Todd A. Keeler (57) ABSTRACT

A data transmission cap represents a maximum amount of data that can be transmitted to and/or from a communication device during a subscriber billing cycle without incurring a penalty under a subscriber rate plan. To limit data transmission to and/or from the communication device as the data transmission cap is approached, a graphical user interface (GUI) is displayed. The GUI includes one or more GUI controls for selecting a data transmission limiting tactic from a plurality of distinct data transmission limiting tactics and for specifying a data transmission threshold at which the selected tactic is to take effect, the threshold being below the operative cap. Upon user interaction with the GUI control(s), user input indicating the selected data transmission tactic and specified data transmission threshold is received. The communication device or another electronic device in communication therewith is configured to effect the selected data transmission limiting tactic when the specified data transmission threshold is reached.

20 Claims, 7 Drawing Sheets

(51) Int. Cl.
*H04W 4/24* (2009.01)
*H04W 4/26* (2009.01)

(52) U.S. Cl.
CPC ......... *H04M 15/82* (2013.01); *H04M 15/8214* (2013.01); *H04M 15/83* (2013.01); *H04M 15/835* (2013.01); *H04M 15/84* (2013.01); *H04M 15/844* (2013.01); *H04M 15/846* (2013.01); *H04M 15/85* (2013.01); *H04M 15/851* (2013.01); *H04M 15/852* (2013.01); *H04M 15/853* (2013.01); *H04M 15/854* (2013.01); *H04M 15/858* (2013.01); *H04M 15/88* (2013.01); *H04M 15/881* (2013.01); *H04W 4/24* (2013.01); *H04W 4/26* (2013.01); *H04M 2215/012* (2013.01); *H04M 2215/0112* (2013.01); *H04M 2215/0116* (2013.01); *H04M 2215/2033* (2013.01); *H04M 2215/78* (2013.01); *H04M 2215/782* (2013.01); *H04M 2215/81* (2013.01); *H04M 2215/8104* (2013.01); *H04M 2215/815* (2013.01); *H04M 2215/8129* (2013.01); *H04M 2215/8137* (2013.01); *H04M 2215/8141* (2013.01); *H04M 2215/8158* (2013.01); *H04M 2215/8162* (2013.01); *H04M 2215/8166* (2013.01); *H04M 2215/8183* (2013.01); *H04M 2215/82* (2013.01)

(56) References Cited

U.S. PATENT DOCUMENTS

| | | | |
|---|---|---|---|
| 6,999,748 B2 | 2/2006 | White | |
| 7,110,753 B2 * | 9/2006 | Campen | 455/419 |
| 7,433,943 B1 * | 10/2008 | Ford | 709/223 |
| 2002/0054569 A1 | 5/2002 | Morikawa | |
| 2004/0063422 A1 | 4/2004 | Nickum | |
| 2004/0132438 A1 | 7/2004 | White | |
| 2004/0228277 A1 | 11/2004 | Williams | |
| 2006/0045245 A1 * | 3/2006 | Aaron et al. | 379/111 |
| 2006/0143282 A1 * | 6/2006 | Brown et al. | 709/227 |
| 2007/0083482 A1 * | 4/2007 | Rathi et al. | 707/1 |
| 2007/0136195 A1 | 6/2007 | Banjo | |
| 2009/0068984 A1 * | 3/2009 | Burnett | 455/408 |
| 2010/0022216 A1 * | 1/2010 | Bandera et al. | 455/405 |

OTHER PUBLICATIONS

Savin, Daniela. Canadian Intellectual Property Office Examiner's Report dated Aug. 21, 2012, in relation to Canadian Patent Application No. 2,685,150, 3 pages.

* cited by examiner

LIMITING DATA TRANSMISSION TO AND/OR FROM A COMMUNICATION DEVICE AS A DATA TRANSMISSION CAP IS APPROACHED AND GRAPHICAL USER INTERFACE FOR CONFIGURING SAME

FIELD OF TECHNOLOGY

This disclosure relates to limiting data transmission to and/or from a communication device. It also relates to a graphical user interface (GUI) for configuring such limiting of data transmission. It further relates to associated methods, machine-readable media, systems and communication devices.

BACKGROUND

It is not uncommon for wireless carriers or other providers of data services to offer rate plans in which the amount payable by a subscriber during a billing cycle is tied to the total amount of data transmitted, i.e. sent and/or received, by the subscriber's wireless device during that cycle (e.g. monthly). For example, a wireless carrier may charge a subscriber, say, $40/month for data transmission (sometimes referred to colloquially as "bandwidth consumption") not in excess of a data transmission cap ("rate plan cap", "bandwidth cap", "bit cap", or simply "cap"), which may be, e.g., 25 Megabytes, and a surcharge of $2/megabyte for data transmission in excess of that cap. However, at any given time, the subscriber may be unaware of the amount of data already transmitted in relation to the rate plan cap and, as a result, uncertain whether data transmission will result in a surcharge. Even if the subscriber were aware of the amount of data already transmitted, s/he may fail to take the necessary steps to limit data transmission as the cap draws near, e.g. due to inexperience with device configuration or preoccupation with daily activities. Thus the subscriber may continue to engage in activities which may involve significant data transmission, such as wireless web browsing, file downloads and sending or receiving email or multimedia service (MMS) messages, and may inadvertently exceed the data transmission cap and undesirably incur a surcharge or other penalty.

A solution which addresses the above-noted problem or others would be desirable.

DESCRIPTION OF THE DRAWINGS

Aspects and features of the disclosed method and device will become apparent to those of ordinary skill in the art upon review of the following description of specific embodiments in conjunction with the accompanying figures. In the figures which illustrate at least one example embodiment.

DETAILED DESCRIPTION

In one aspect of the below described embodiment, there is a method of limiting data transmission to, from, or to and from a communication device, the method comprising: displaying a graphical user interface (GUI), said GUI comprising one or more GUI controls for selecting a data transmission limiting tactic from a plurality of distinct data transmission limiting tactics and for specifying a data transmission threshold at which the selected data transmission limiting tactic is to take effect, said data transmission threshold below an operative data transmission cap, said data transmission cap representing a maximum amount of data that can be transmitted to, from, or to and from said communication device during a subscriber billing cycle without incurring a penalty under a subscriber rate plan; by way of said one or more GUI controls, receiving user input indicating the selected data transmission tactic and the specified data transmission threshold; and based on said user input, configuring said communication device or another electronic device in communication therewith to effect the selected data transmission limiting tactic when the specified data transmission threshold is reached.

In another aspect of the below described embodiment, there is provided a machine readable medium storing instructions for limiting data transmission to, from, or to and from a communication device that, when executed by one or more processors of said communication device, cause said communication device to: display a graphical user interface (GUI), said GUI comprising one or more GUI controls for selecting a data transmission limiting tactic from a plurality of distinct data transmission limiting tactics and for specifying a data transmission threshold at which the selected data transmission limiting tactic is to take effect, said data transmission threshold being below an operative data transmission cap, said data transmission cap representing a maximum amount of data that can be transmitted to, from, or to and from said communication device during a subscriber billing cycle without incurring a penalty under a subscriber rate plan; by way of said one or more GUI controls, receive user input indicating the selected data transmission tactic and the specified data transmission threshold; and based on said user input, configure said communication device or another electronic device in communication therewith to effect the selected data transmission limiting tactic when the specified data transmission threshold is reached.

In yet another aspect of the below described embodiment, there is provided a communication device comprising: at least one processor; and memory interconnected with said at least one processor storing instructions for limiting data transmission to, from, or to and from said communication device that, when executed by said processor, cause said communication device to: display a graphical user interface (GUI), said GUI comprising one or more GUI controls for selecting a data transmission limiting tactic from a plurality of distinct data transmission limiting tactics and for specifying a data transmission threshold at which the selected data transmission limiting tactic is to take effect, said data transmission threshold being below an operative data transmission cap, said data transmission cap representing a maximum amount of data that can be transmitted to, from, or to and from said communication device during a subscriber billing cycle without incurring a penalty under a subscriber rate plan; by way of said one or more GUI controls, receive user input indicating the selected data transmission tactic and the specified data transmission threshold; and based on said user input, configure said communication device or another electronic device in communication therewith to effect the selected data transmission limiting tactic when the specified data transmission threshold is reached.

Figure 1:
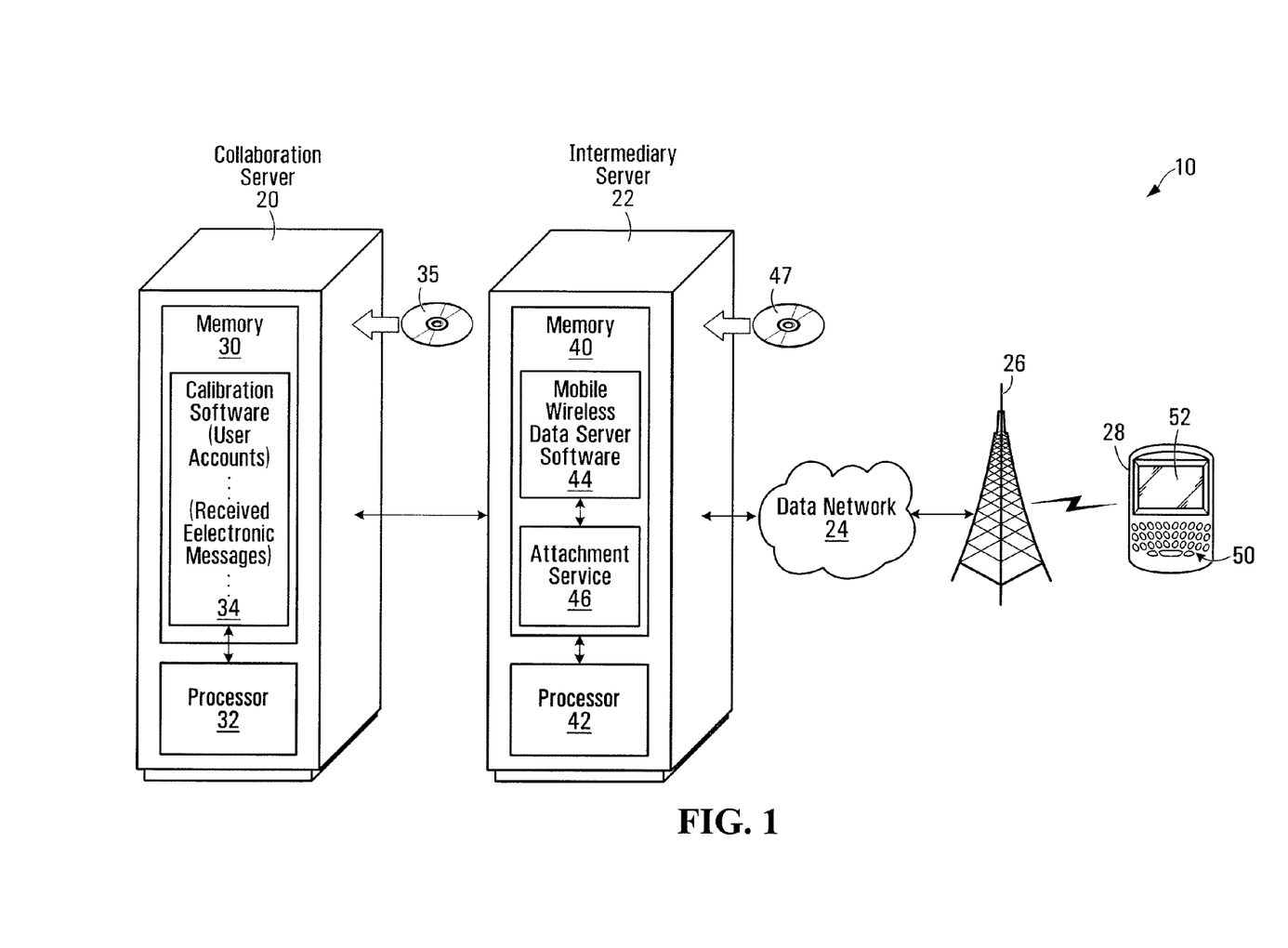
FIG. 1 is a schematic diagram illustrating a system that is configurable to limit data transmission as a data transmission cap is approached.

FIG. 1 illustrates an exemplary system 10 that is configurable to limit data transmission to and/or from a communication device (specifically, wireless communication device 28) as a data transmission cap is approached. The system 10 is a modification of a conventional system that automatically transmits ("pushes") email messages and other types of data to wireless communication devices. As illustrated, system 10 includes a collaboration server 20, an intermediary server 22, a data network 24, a wireless network 26 and a wireless communication device 28.

Collaboration server 20 is a conventional server having memory 30 in communication with at least one processor 32. The exemplary processor 32 executes collaboration software 34, such as Microsoft® Exchange Server, Lotus® Domino® Server or the like. The software 34, maintains accounts for multiple users. Each account has various associated capabilities intended to support collaboration between users, such as electronic messaging (e.g. email and instant messaging), calendaring and address book capabilities for example. Email capabilities typically includes maintaining an inbox for each user that is capable of receiving email messages optionally having attachments. The attachments may for example be "electronic business card" attachments, Microsoft® Word documents, Microsoft® Excel™ spreadsheets, Microsoft® PowerPoint™ presentations, Adobe® Portable Document Format (PDF) documents, HyperText Markup Language (HTML) files, various image file formats (e.g. .wmf, .emf, .gif, .jpeg, .bmp, .png), .wav files, Zip archive and American Standard Code for Information Interchange (ASCII) files. The email messages and attachments may be received at collaboration server 20 in the Multipurpose Internet Mail Extensions (MIME) format for example. Some email messages may be formatted using a HyperText Markup Language (HTML), as is conventional. Instant messaging capability may include the ability to define a "buddy list" or "friend list", receive presence updates regarding users in that list, and send and receive instant messages (possibly with multimedia content such as images, video and documents) to selected users. Calendaring capabilities may include the capacity to schedule appointments, invite other users to attend scheduled appointments, and check other users' public scheduled appointments for example. Address book capabilities may include maintaining contact information (e.g. name, address, telephone numbers, etc.) for numerous contacts. Machine-readable instructions (e.g. an executable image) comprising the collaboration software 34 may be loaded from a machine-readable medium 35 into memory 30 prior to execution by processor 32.

Intermediary server 22 may be a server product sold by Research in Motion Limited. The intermediary server 22 executes two software applications which intercommunicate during operation: the mobile wireless data server software 44 and the attachment service 46.

The mobile wireless data server software 44 is a software application that is responsible for "pushing" certain data associated with a user account at collaboration server 20 (e.g. received email messages) to the wireless communication device 28. The software 44 communicates with collaboration server 20 for purposes of monitoring specified user accounts for activity and for pushing data representative of that activity to the device 28. For example, when a new email message is received, the email message may be automatically converted to a proprietary format known as Compressed Multipurpose Internet Mail Extensions (CMIME) and transmitted to the wireless communication device 28 as a stream of bytes, via data network 24 (possibly through a firewall, not expressly illustrated in FIG. 1). A similar mechanism is used for instant messages and for syncing a new address book entry from the server with the wireless device. Instant messaging may use the a proprietary protocol (e.g. BlackBerry Instant Messaging or "BBIM") to communicate with the intermediary server that in turn communicates with an IM collaboration server. Address book uses a proprietary SYNC protocol to communicate with the intermediary server that in turn talks to the collaboration server. In addition, the software 44 receives email attachment requests from device 28 and intercommunicates with attachment service 46 for the purpose of obtaining the desired attachments for transmission to the device 28, on an on-demand basis.

In pushing email messages to wireless communication device 28, software 44 may be responsible for automatically breaking email messages exceeding a predetermined threshold size into "chunks". The first chunk is pushed to the device 28 automatically, while subsequent chunks are transmitted to the device 28 individually, on an on-demand basis. The rationale for this functionality is to seek user confirmation that a large message is truly desired at the device 28 before it is transmitted there in full, to avoid unnecessarily transmitting large amounts of data and possibly risking a surcharge or other penalty for excessive wireless data transmission under a subscriber rate plan (as described below). The "on-demand" request for a next chunk of an email message may be generated at device 28 and sent to server 22, e.g., when a user of device 28 selects a "more" menu item within an email message application to indicate a desire to display a next portion of the message. As will be appreciated, the behavior of this mechanism may be capable of being dynamically changed in the present embodiment as a data transmission cap is approached, with a view to limiting data transmission to/from the device 28.

The attachment service 46 is a software application that processes email attachments in preparation for their possible transmission to and viewing at a wireless communication device such as device 28. The attachment service 46 intercommunicates with the mobile wireless data server software 44 for the purpose of handling requests for email attachments, or portions thereof, from wireless communication devices such as device 28 and for coordinating delivery of requested attachments or attachment portions to the wireless communication device 28 via data network 24 and wireless network 26. Generally, when an email message having an attachment is received at a user's inbox at collaboration server 20, the email message (or a first chunk thereof) is pushed to the wireless communication device 28 along with an indication of the existence of the attachment. The user of device 28 will be made aware of the fact that the received message includes an attachment. However, transmission of the attachment to the device 28 may be deferred until the user of device 28 has specifically indicated a desire to view it. This is again to avoid inadvertent transmission of a large amount of data (which the attachment may represent) under a subscriber rate plan in which a surcharge may be owed, or other penalty incurred, for data transmission in excess of a predetermined cap. Large attachments may be broken into chunks to be transmitted to device 28 individually on demand, in a similar fashion to the breaking up of large email messages into chunks, described above. This is possibly in accordance with U.S. patent application Publication No. 2005/0108636, which is hereby incorporated by reference hereinto.

As will be described, either or both of mobile wireless data server software 44 and attachment service 46 may be modified from its conventional form to support the limiting of data transmission to and/or from wireless communication device 28 as a data transmission cap is approached. Machine-readable instructions (e.g. an executable image) comprising the mobile wireless data server software 44 and attachment service software 46 may be loaded from a machine-readable medium 47 into memory 40 prior to execution by processor 42.

The intermediate server may also store in memory "collections" of data representing a back-up of user-specified data form the wireless communication device 28, on a per-user basis Data network 24 is a conventional data network which is used to transmit data, which in this embodiment includes electronic messages such as email message and any attachments or instant messages, and possibly synchronization's of data (e.g. address book contacts) between the collaboration software 34 on server 20 and the relevant application (e.g. address book 64) at the wireless communication device 28. The network may deliver the data to a network operation centre (not illustrated) for purposes of relaying to the wireless network 26. The data network 24 also transmits on-demand requests for email chunks or email attachment chunks in the opposite direction to the intermediary server 22. Data network 24 may be the public Internet or a privately managed and operated Internet Protocol (IP) network for example.

Wireless network 26 is a conventional wireless network which serves as the final link in the communication chain between the intermediary server 22 and the wireless communication device 28. Network 26 may for example be a mobile data communication network, such as a Mobitex™, DataTAC™ or General Packet Radio Service (GPRS) mobile data communication network, or a conventional voice communication network, such as Advanced Mobile Phone Service (AMPS), Time Division Multiple Access (TDMA), Code Division Multiple Access CDMA, Personal Communications Service (PCS) or Global System for Mobile Communications (GSM) for example. Other types of data and voice networks, separate and integrated, could alternatively be utilized for network 26.

Wireless communication device 28 is a two-way radio frequency (RF) communication device having data communication capabilities, such as a handheld device sold by Research In Motion Ltd. The use of device 28 for receiving and/or transmitting data is governed by a subscriber rate plan between the user of device 28 (a "subscriber") and a wireless service provider. The plan defines an operative data transmission cap representing a maximum amount of data that can be transmitted to, from, or to and from the device 28 during a subscriber billing cycle (e.g. monthly) without incurring a surcharge or other penalty. The device 28 has been modified from a conventional configuration in order to support configuration of components of system 10 for limiting data transmission to and/or from the device 28 as the data transmission cap is approached), as described below. Wireless communication device 28 is illustrated in greater detail in FIG. 2.

Figure 2:
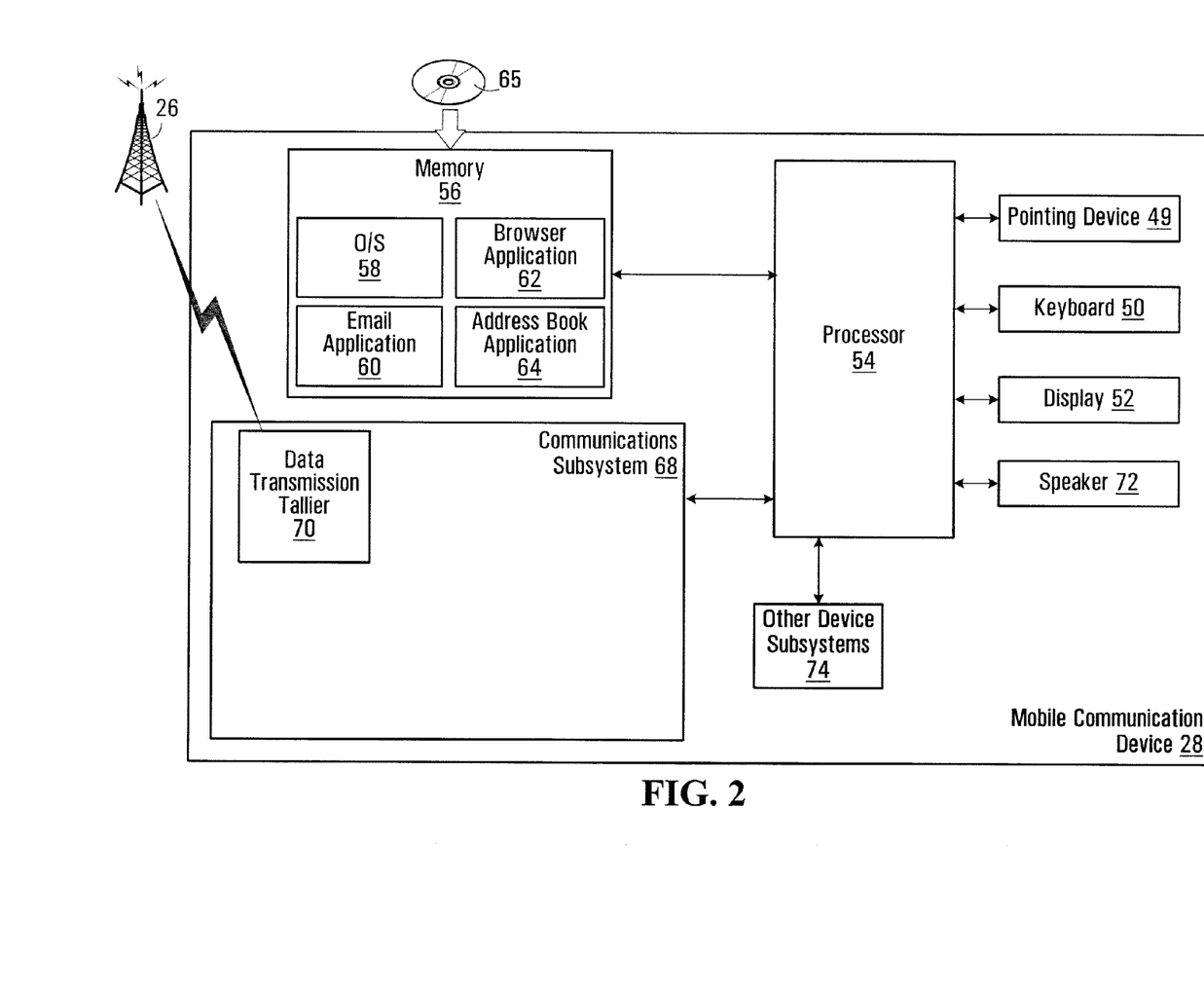
FIG. 2 is a schematic diagram illustrating a wireless communication device component of the system of FIG. 1 in greater detail.

Referring to FIG. 2, wireless communication device 28 includes a pointing device 49, keyboard 50, a display 52, a processor 54, memory 56 and a communications subsystem 68. These components are communicatively coupled as illustrated in FIG. 2.

Pointing device 49 is a user input device which permits the user to move a cursor about display 52 for the purpose of highlighting and/or selecting GUI controls such as buttons or menu items. The device 49 may for example be a trackwheel, trackball or touchscreen.

Keyboard 50 is a user input device which permits a user of the wireless communication device 28 to enter text for such purposes as composing and sending email for example.

Display 52 is an output device that is capable of presenting a graphical user interface to a user. The display 52 may be a full graphic Liquid Crystal Display (LCD) for example. The dimensions of display 52 may be limited due to the limited overall size of the device 28.

Processor 54 is a conventional processor which controls the overall operation of the wireless communication device 28 based on user manipulation of pointing device 49, user actuation of keys on the keyboard 50 and the receipt of data from wireless network 26. The microprocessor 54 executes operating system software and application software that is stored in local memory 56. Microprocessor 54 is communicatively coupled (either directly or indirectly) to the keyboard 50, display 52, memory 56 and communication subsystem 68, as illustrated in FIG. 2.

Memory 56 stores operating system and other software used at the device 28, including operating system software 58, email application 60; browser application 62, and address book application 64. Memory 56 may consist of flash memory, random access memory (RAM), read only memory (ROM), or a combination of these for example. Typically, at least some of memory 56 will be persistent. It will be appreciated that memory 56 is a form of machine-readable medium.

Operating system ("o/s") software 58 is software which governs the basic operation of wireless communication device 28. In the present embodiment, the o/s software 58 has been modified to provide a GUI that permits the user of device 28 to configure various components of system 10 for limiting data transmission as the subscriber's data transmission cap for device 28 is approached, as will be described. In general, the GUI may be part of the same software component that includes the SyncManager API (described below), which is not necessarily part of the operating system. Additionally, the o/s software 58 of the present embodiment includes a SyncManager Application Programming Interface (API). This API provides a mechanism for a software application executing at device 28 to cause an application-specified collection of data to be periodically backed up at (i.e. synchronized with) collaboration server 20, e.g. for possible later restoration to the device 28. A known version of this API is presently described at blackberry.net/developers/docs/4.1api/net/rim/device/api/synchronization/SyncManager.html, which description is hereby incorporated by reference hereinto. The API permits the user to specify whether a particular collection shall be synchronized "over-the-air" (OTA), i.e. via a wireless transmission medium (referred to as the "primary" transmission medium), or "serially", i.e. via a wired transmission medium (referred to as the "secondary" transmission medium). For example, by invoking SyncManager.allowOTASync( ) with a first parameter indicating the collection to be "synced" (i.e. backed up) and a second parameter set to "true" or "false", the identified collection may be synchronized using the primary or secondary media, respectively.

Email application 60 is a software application that is capable of managing and displaying email messages and email message attachments at device 28. The email application 60 incorporates an attachment viewer component which facilitates the viewing of recognized attachments.

Browser application 62 (or simply "browser 62") is a software application that is capable of displaying markup language documents (e.g. HTML or Wireless Markup Language documents) having embedded images. The browser 62 is dynamically user-configurable to either display or not display such embedded images, at the election of the user.

Address book application 64 is a software application that allows the user of device 28 to view and maintain contact information (name, address, telephone numbers, etc.) for numerous contacts. The contacts are the same contacts as are maintained by the collaboration software 34 at server 20 (FIG. 1). These contacts are periodically synchronized between device 28 and server 20. Synchronization may be performed either via the primary (wireless) transmission medium or the secondary (wired) transmission medium, at the election of the user, in a similar fashion to the backing up of data collections, described above.

The above software applications may be accompanied by various other software applications, such as an instant messaging application for example, resident in memory 56 (not expressly illustrated). Machine-readable instructions (e.g. an executable image) comprising the o/s software 58 and the various software applications in memory 56 may be loaded from a machine-readable medium 65 prior to execution at wireless communication device 28. This may occur at the factory in which device 28 is assembled. Alternatively, such instructions may be downloaded to the device 28 via wireless network 26 by way of an over-the-air download. Similarly, any software aspects of data transmission tallier 70 (described below) may be loaded or downloaded in like fashion.

Communication subsystem 68 is responsible for effecting data communications (and possibly voice communications) between the device 28 and rest of system 10 via wireless network 26. Subsystem 68 may include such components as a receiver, a transmitter, one or more antennas, and a digital signal processor, none of which are expressly illustrated. The subsystem also includes a data transmission tallier module 70. The tallier module 70 is a software, firmware, or hardware component (or a component that is a combination of two or more of those types of components) that is responsible for tallying how much data has been transmitted to and/or from the wireless communication device 28 during a current billing cycle. The tallier module 70 may operate at a transport protocol level, tracking the number and size of packets being transmitted to and/or from the device 28 for example. The tallier module 70 may interact with o/s software 58, e.g. for the purpose of being instructed to reset a tally (e.g. at the beginning of a billing cycle) or to report a current tally. The o/s 58 may be configurable, either by the user or through automated processing of an electronic communication from the wireless service provider, for the purpose of setting the billing cycle start date and duration. This is so that the dates at which the tallier module 70 should be instructed to "reset" to zero may be automatically computed.

The wireless communication device 28 also includes a speaker 72 and may further include various other device subsystems 74.

Operation for limiting data transmission to and/or from the wireless communication device 28 as a data transmission cap is approached shall now be described. It is initially assumed that a user of device 28, concerned over the possibility of incurring a surcharge or other penalty for excessive data transmission to and/or from the device 28 under a subscriber rate plan, wishes to configure the system 10 to automatically limit data transfer as the cap is approached. Accordingly, the user interacts with the device 28, e.g. using pointing device 4, so as to invoke a GUI 300 on display 52 for performing such configuration. GUI 300 illustrated in FIGS. 3 to 7.

Figure 3:
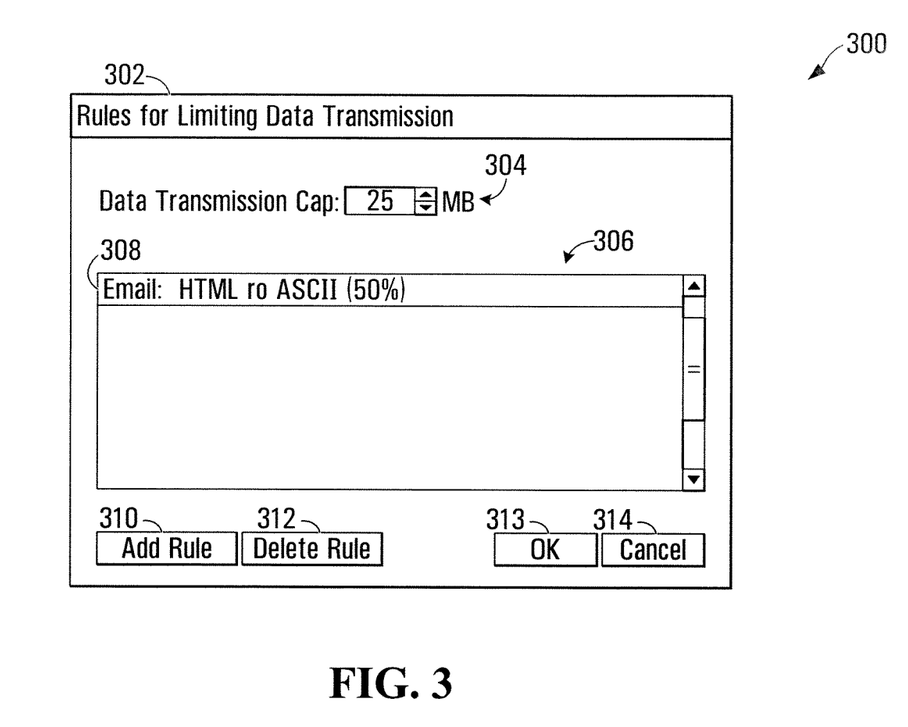
FIGS. 3 to 7 illustrate aspects of a graphical user interface used to configure one or more communication devices within the system of FIG. 1 to limit data transmission as a data transmission cap is approached.

Referring to FIG. 3, an initial dialog box 302 of GUI 300 is identifiable by the label RULES FOR LIMITING DATA TRANSMISSION within its title bar. Dialog box 302 contains various GUI controls, namely a spinner 304, a list box 306, and four buttons 310, 312, 313 and 314.

Spinner 304 is used to set the data transmission cap that is defined by the subscriber's rate plan. The spinner may default to zero or to a value that is communicated by the wireless service provider, e.g. via an email message from the provider indicative of the operative cap. Such an email message may be automatically processed at the device 28 in order to populate spinner 304. In the present example, the spinner 304 shows that the currently operative cap is 25 megabytes. In some embodiments, this amount is user configurable (e.g. may be set, increased or decreased by the user).

List box 306 shows the currently defined rules for limiting data transmission to and/or from device 28. A single entry 308 in FIG. 3 represents the single rule that is presently defined. That rule employs a data limiting tactic whereby any email message in an HTML format shall be converted to ASCII before being sent to or from the device 28, in order to reduce the size of its body. The parenthesized value 50% in entry 308 represents the percentage of the operative data transmission cap that must be reached before the rule takes effect. Thus, in the present example, the rule becomes operative when 12.5 MB of data (i.e. 50% of the operative cap of 25 MB) has been transmitted during the current billing cycle.

Buttons 310, 312, 313 and 314 are for adding a new rule to list box 306, deleting a selected rule from list box 306, accepting the rules as defined, or exiting the dialog box 302 without accepting any changes to the rules, respectively. Selection of button 310 results in the invocation of a further dialog box 320 of GUI 300, which is shown in FIG. 4.

Figure 4:
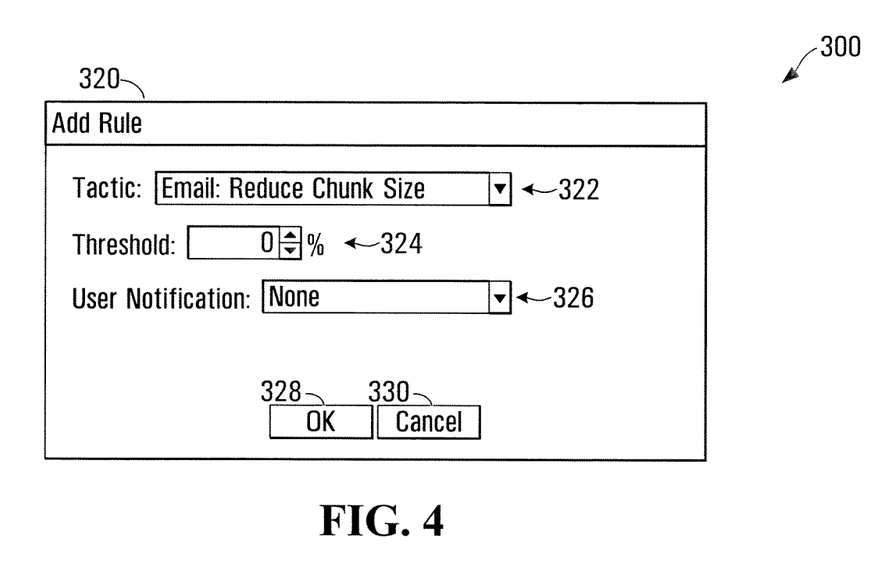

Referring to FIG. 4, dialog box 320 allows the user to define a new rule to be added to those already shown in list box 306 of FIG. 3. Dialog box 320 contains various GUI controls, namely a combo box 322 for selecting a data limiting tactic from a plurality of tactics, a spinner 324 for specifying a data transmission threshold at which the selected tactic is to take effect, a combo box 326 for configuring a user notification to be provided when the tactic takes effect, and "OK" and "Cancel" buttons 328 and 330 for accepting the new rule or exiting from dialog box 320, respectively. The combo boxes 322 and 326 and spinner 324 are shown to contain default values in FIG. 4.

Figure 5:
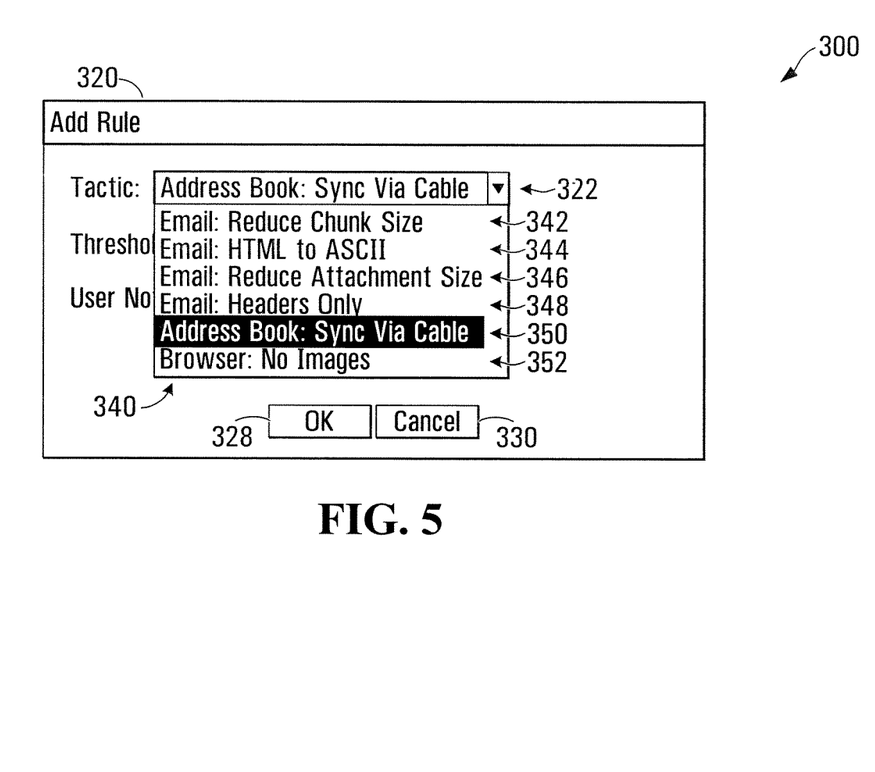

User interaction with combo box 322 results in the presentation of a drop-down menu 340, as shown in FIG. 5. The six menu items in the drop-down menu 340 represent six distinct data transmission limiting tactics of the present embodiment, from any which one may be selected.

Referring to FIG. 5, first menu item 342 represents a data limiting tactic whereby a size of chunks into which an electronic message (e.g. email message) exceeding a threshold size is subdivided for individual on-demand transmission to the wireless communication device 28 (from intermediary sever 22) is reduced. This tactic may be implemented in the present embodiment at mobile wireless data server software 44 of server 22 (FIG. 1).

A second menu item 344 represents a data limiting tactic whereby a size of a body of an electronic message is reduced prior to its transmission to or from said wireless communication device 28. Specifically, the tactic causes any email message in an HTML format to be converted to ASCII before being sent to or from the device 28, as noted above. For messages that are incoming to the device 28, this tactic may be implemented at mobile wireless data server software 44 of server 22 (FIG. 1) in the present embodiment. For messages that are outgoing from the device 28, this tactic may be implemented within email application 60 (FIG. 2) in the present embodiment.

A third menu item 346 represents a data limiting tactic whereby a size of an attachment of an electronic message is reduced prior to its transmission to the wireless communication device 28. The reduction in size of the attachment may for example by achieved through such techniques as data compression, reduction in image resolution, or other approaches. For example, it may be possible for certain attachment types to be broken down into a number of pieces, the first of which could be sent to the device with the option provided to the user to fetch the rest if desired (e.g. an attached email thread or plain text file attachment). In the present example, this tactic applies to attachments to messages that are incoming to the device 28, and may thus be implemented within attachment service 46 at server 22 (FIG. 1).

A fourth menu item 348 represents a data limiting tactic whereby only a header portion of an electronic message is transmitted to or from the wireless communication device 28. For messages that are incoming to the device 28, this tactic may be implemented at mobile wireless data server software 44 of server 22 (FIG. 1). For messages that are outgoing from the device 28, this tactic may be implemented within email application 60 (FIG. 2).

A fifth menu item 350 represents a data limiting tactic whereby the transmission of data to or from the device 28 is changed from occurring over a primary transmission medium (to which the data transmission cap is applicable) to a secondary transmission medium (to which the data transmission cap is not applicable). In particular, the rule specifies that address book synchronization between application 64 of FIG. 2 and collaboration software 34 of FIG. 1 shall occur via cable rather than over-the-air. It is assumed that menu item 350 has been selected by the user.

A sixth menu item 352 represents a data limiting tactic whereby browser 62 at device 28 (FIG. 2) is configured to refrain from requesting images within browsed documents.

It will be appreciated that the six menu items illustrated in FIG. 5 are illustrative only and that the number of menu items may be larger or smaller than six in alternative embodiments. Moreover, the data limiting tactics employed in alternative embodiments may differ wholly or partly from those represented in menu 340. For example, an alternative embodiment may use the aforementioned sync API of the o/s 58 to dynamically change the backing up of a data collection from the primary (wireless) transmission medium to the secondary (wired) transmission medium.

Figure 6:
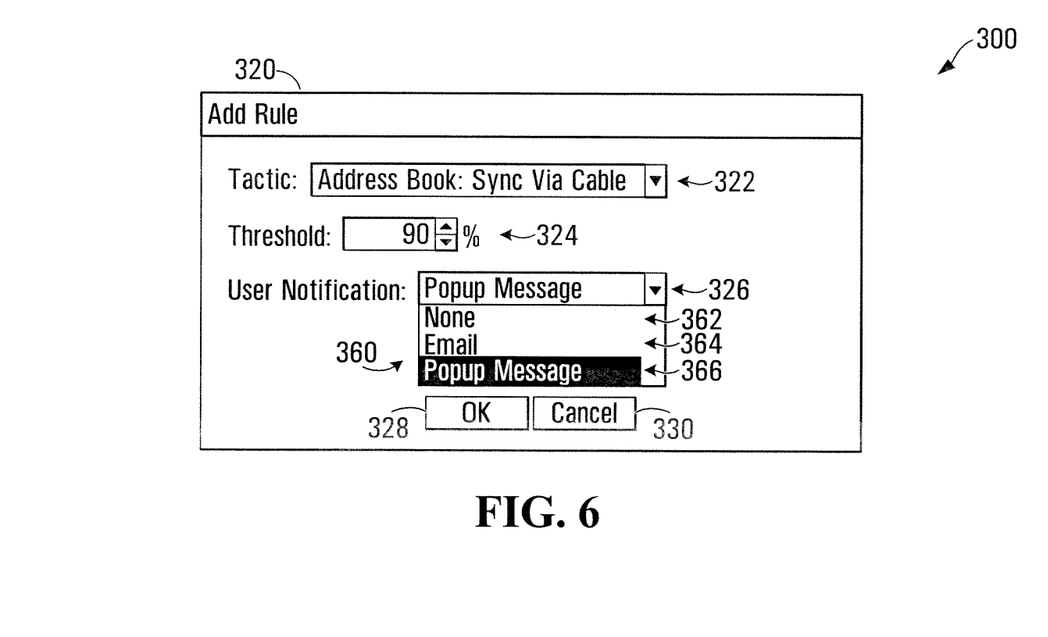

Next, and with reference to FIG. 6, the user, through interaction with spinner 324, specifies a data transmission threshold at which the data transmission limiting tactic represented by the menu item 350 is to take effect. In the illustrated example, a value of 90% is specified, meaning that the selected tactic is to take effect when the data transmission tally is at 90% of the operative cap. In general, the GUI control(s) by which the data transmission threshold is specified should permit specification of the threshold below the operative data transmission cap, in order to support activation of the tactic(s) as the cap is approached. In some embodiments, the threshold may be specified as a relative amount, such as a percentage less than 100% or a fraction less than one. This may be advantageous in that the user can specify the threshold even without knowing the value of the operative cap. Another possible advantage of expressing a threshold as a relative amount is that the threshold may not need to be updated if the cap increases or decreases, because the relative proportion of the threshold to the cap will remain unchanged. Alternatively, the threshold may be expressed as an absolute amount (e.g. 12.5 MB). In such cases it may be desirable to also display the operative cap as an absolute amount (e.g. 25 MB) in the GUI so that the user may compare the two if desired. In some embodiments, the GUI control(s) may actively preclude specification of a data transmission threshold at or above the operative data transmission cap. This is to force specification of thresholds below the cap. For example, the maximum value that can be specified by spinner 324 of FIG. 3 may be 99%, which would be lower than the percentage 100% that represents the cap amount.

Subsequent user interaction with combo box 326 results in the presentation of a drop-down menu 360. The three menu items in the drop-down menu 360 represent three different user notifications that may be provided when the selected data transmission tactic is effected. Specifically, the first menu item 362 is for configuring the device 28 to provide no user notification when the tactic takes effect. The second menu item 364 specifies that user notification is to take the form of an email message (which may not be an email message by strict definition, but rather may be a new entry in a message list that actually originates at the device 28 but is made to appear as a received email message or other type of message, with the rationale being that, because the user is familiar with checking for new messages in the message list, the message is likely to be seen.) The third menu item 366 (which is shown as having been selected in FIG. 6) specifies that user notification is to take the form of a popup message, e.g. displayed on the display 52 of wireless communication device 28 (FIG. 2). The number and types of user notifications may vary in alternative embodiments.

When the user has completed interaction with the GUI controls 322, 324 and 326 of FIG. 6, selection of OK button 328 causes dialog box 320 to close. When dialog box 302 is redisplayed, a new entry 309 representing the newly defined rule appears within list box 306, as shown in FIG. 7.

Figure 7:
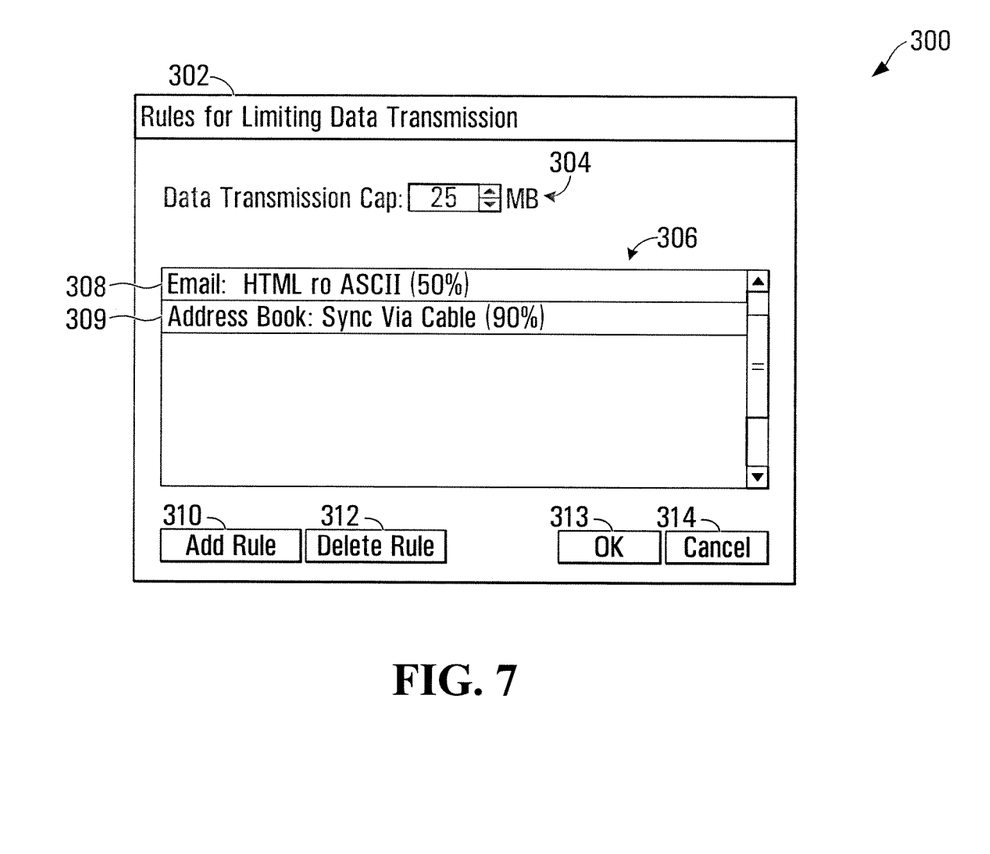

Referring to FIG. 7, selection of the OK button 313 causes the currently defined rules to be accepted. When this occurs, appropriate steps are taken to configure device 28 and/or one or more communication devices in communication with device 28 (e.g. server 20 or 22) as necessary for the selected data transmission limiting tactics to automatically take effect when the respective data transmission thresholds are reached. The determination of whether configuration is to occur locally (i.e. at the same communication device 28 at which the GUI 300 is displayed) or remotely (i.e. at a communication device in communication with device 28, such as server 22) will usually depend, at least in part, upon the tactics that have been selected. For example, in the present embodiment, the first data limitation rule (represented by entry 308 of FIG. 7) entails configuration of both of the server 22 and device 28, as noted above, while the second rule (represented by entry 309 of FIG. 7) entails only configuration of the address book application 64 at device 28 (FIG. 2). Should remote configuration be required, this may be achieved through transmission of at least one appropriate command to the device(s) to be configured for causing the necessary configuration to occur. The commands by be specific to the tactic being used and may serve to set flags or configuration options at the target device (s) as might otherwise be user-configurable. At the device(s) to be configured, the steps involved in achieving the desired configuration may include writing to a electronic configuration file, setting a flag, invoking a routine of a relevant piece of software, or the like.

Once the necessary configuration has been performed, the subscriber may use wireless communication device 28 to engage in various activities which may involve data transmission, such as wireless web browsing, file downloads and sending or receiving email messages with large attachments. The o/s 58 will automatically instruct the data transmission tallier module 70 (FIG. 2) to reset at the beginning of each billing cycle. The module 70 will keep a running tally of the amount of data transmitted during the current billing cycle. When one of the specified data transmission thresholds is reached, the selected data transmission limiting tactic will automatically be effected.

For example, in the present embodiment, when 50% of the data transmission cap is reached, the first data transmission limiting tactic (i.e. email conversion from HTML to ASCII), represented by entry 308 of FIG. 7, is effected. To the extent that user notification of this occurrence was elected using GUI control 326 (FIG. 4), the user notification is provided, in order to apprise the user of the activation of the relevant data limiting tactic. As noted above, for messages that are incoming to the device 28, this tactic may be implemented at mobile wireless data server software 44 of intermediary server 22 (FIG. 1). To apprise intermediary server 22 that the tactic is to be activated, the device 28 may send a command to the intermediary server 22 to cause email messages to be converted from HTML to ASCII before being transmitted to the device 28. This may involve setting an appropriate flag or configuration option at server 22. Indeed, server 22 may be unaware of the data transmission limiting tactic as such or of the operative thresholds. Rather, it may simply act as a "slave" to the device 28, implementing commands from device 28 on demand. The device 28 may thus serve as the "master" of the operative data transmission limiting scheme, commanding other devices as necessary for the currently operative tactics. A similar mechanism may be employed when one or more tactics is/are to be deactivated (e.g. at the beginning of a next billing cycle).

Later, when 90% of the data transmission cap is reached, the second data transmission limiting tactic (i.e. address book syncing via cable rather than over the air), represented by entry 309 of FIG. 7, is effected. Again, to the extent that user notification for apprising the user of the activation of the data limiting tactic has been preconfigured to occur, the desired user notification takes place. Activation of this tactic may occur solely at the device. That is, because there is no intermediary server component to this tactic, the device 28 may activate simply by configuring itself to sync its address book collection with the intermediary server 22 serially, i.e. by way of a cable, rather than over-the-air (OTA). This may be accomplished by appropriately invoking the SyncManager API, as described above.

It will be appreciated that, when the second data limiting tactic is effected at 90% of the cap, this is in addition to the first data limiting tactic which has already been in effect since the data transmission tally reached 50% of the cap. This illustrates the fact that definition of "tiers" of data limiting tactics is possible. That is, the user may configure the system 10 so that, the closer the data transmission tally is to the cap, the more data limiting tactics will take effect. This may have the effect of progressively reducing data transmission by ever-increasing amounts as the cap is approached, with a view to reducing the likelihood that the cap will be exceeded. This occurs even absent user awareness of the current data transmission tally. In some embodiments, the user may be kept aware of the current tally, as well as any currently active data limiting tactics, e.g., through the use of suitable icons or text in a GUI displayed during run time. The tally may be represented as a percentage for example, while the currently active data limiting tactics may be represented as icons.

As will be appreciated by those skilled in the art, various modifications can be made to the above-described embodiments. For example, some embodiments may not display the operative data transmission cap as shown in FIG. 3 at 304. The operative cap may be undisplayed or may be displayed in such a manner that it is not user configurable. When the cap is undisplayed, it may be preferable for the data transmission threshold to be expressed as a relative amount, e.g. a percentage or fraction, so that the user may appreciate the relative proportion of the threshold to the cap even though the cap amount may be unknown.

It will be appreciated that the above-described approach for limiting data transmission may be used for various types of communication devices, regardless of the transmission medium or media over which they are capable of communicating (wireless, wired, fiber optic, etc.). This approach is not limited to wireless communication devices, nor is it necessarily only for use in push email systems. Moreover, the GUI that is used to configure the data limiting tactics and thresholds at which they are to take effect need not necessarily be displayed at the communication device to and/or from which data transmission is to be limited. For example, GUI 300 could have been displayed at intermediary server 22 (FIG. 1), even if all of the configuration necessary to effect the selected data transmission limiting tactics are to be implemented exclusively at wireless communication device 28. Such configuration of device 28 may be remotely commanded from server 22.

It should further be appreciated that the type of GUI control(s) used for selecting data transmission limiting tactics and associated data transmission thresholds need not be exactly as shown in FIGS. 3 to 7. Other types of GUI controls could be used. For example, one GUI control may comprise an editable table view having three columns labelled "tactic", "threshold" and "notification". Each row in the table may represent a different data limiting tactic. Tactics may be defined by adding new rows to the table or amended by editing the cells within a row.

Other modifications will be apparent to those skilled in the art and, therefore, the invention is defined in the claims.

What is claimed is:

1. A method of limiting data transmission to, from, or to and from a communication device, the method comprising:

displaying a graphical user interface (GUI), said GUI comprising one or more GUI controls for selecting first and second data transmission limiting tactics from a plurality of distinct data transmission limiting tactics and for specifying first and second data transmission thresholds at which the selected first and second data transmission limiting tactics respectively are to take effect, both of said first and second data transmission thresholds being below an operative data transmission cap, said data transmission cap representing a maximum amount of data that can be transmitted to, from, or to and from said communication device during a subscriber billing cycle without incurring a penalty under a subscriber rate plan, wherein said first and second data transmission limiting tactics are distinct and wherein said first and second data transmission thresholds are also distinct;

by way of said one or more GUI controls, receiving user input indicating the selected first and second data transmission tactics and the specified first and second data transmission thresholds; and based on said user input, configuring said communication device or another electronic device in communication therewith to effect the selected first data transmission limiting tactic when the specified first data transmission threshold is reached and configuring said communication device or said other electronic device in communication therewith to effect the second data transmission limiting tactic, in addition to said first data transmission limiting tactic that is already in effect, when the second data transmission threshold is reached, so as to cause data transmission to be automatically and progressively limited through a progressive increase in the number of distinct data transmission limiting tactics that are in effect, even absent user awareness of a current data transmission tally, as the data transmission cap is approached;

wherein each of the plurality of data transmission limiting tactics changes at least one setting at the communication device to reduce the data transmitted to, from, or to and from the communication device; and wherein, when the second data transmission limiting tactic is effected, non-emergency data transmission to and from the communication device is not stopped.

2. The method of claim 1 wherein said first and second data transmission thresholds are each expressed within said GUI as a relative amount of the operative data transmission cap.

3. The method of claim 2 wherein said relative amount is a percentage less than 100% or a fraction less than one.

4. A method of limiting data transmission to, from, or to and from a communication device, the method comprising:

displaying a graphical user interface (GUI), said GUI comprising one or more GUI controls for selecting first and second data transmission limiting tactics from a plurality of distinct data transmission limiting tactics and for specifying first and second data transmission thresholds at which the selected first and second data transmission limiting tactics respectively are to take effect, both of said first and second data transmission thresholds being below an operative data transmission cap, said data transmission cap representing a maximum amount of data that can be transmitted to, from, or to and from said communication device during a subscriber billing cycle without incurring a penalty under a subscriber rate plan, wherein said first and second data transmission limiting tactics are distinct and wherein said first and second data transmission thresholds are also distinct;

by way of said one or more GUI controls, receiving user input indicating the selected first and second data transmission tactic and the specified data first and second transmission thresholds; and based on said user input, configuring said communication device or another electronic device in communication therewith to effect the selected first data transmission limiting tactic when the specified first data transmission threshold is reached and configuring said communication device or said other electronic device in communication therewith to effect the second data transmission limiting tactic, in addition to said first data transmission limiting tactic that is already in effect, when the second data transmission threshold is reached, so as to cause data transmission to be automatically and progressively limited through a progressive increase in the number of distinct data transmission limiting tactics that are in effect, even absent user awareness of a current data transmission tally, as the data transmission cap is approached, wherein each of the plurality of data transmission limiting tactics changes at least one setting at the communication device to reduce the data transmitted to, from, or to and from the communication device said plurality of data transmission limiting tactics includes two or more of:

reducing a size of chunks into which an electronic message exceeding a threshold size is subdivided for individual on-demand transmission to or from said communication device;

reducing a size of a body of an electronic message prior to its transmission to or from said communication device by changing a format of said electronic message from a hypertext markup language (HTML) format to a non-markup language textual format;

transmitting only a header portion of an electronic message to or from said communication device;

transmitting data to or from said communication device not over a primary transmission medium to which said data transmission cap is applicable, but over a secondary transmission medium to which said data transmission cap is not applicable; and configuring a browser at said communication device to refrain from requesting images within browsed documents; and wherein, when the second data transmission limiting tactic is effected, non-emergency data transmission to and from the communication device is not stopped.

5. The method of claim 4 wherein said communication device is a wireless communication device, said primary transmission medium is a wireless transmission medium, and said secondary transmission medium is a wired transmission medium.

6. The method of claim 4 wherein said first and second data transmission thresholds are each expressed within said GUI as a relative amount of the operative data transmission cap.

7. The method of claim 6 wherein said relative amount is a percentage less than 100% or a fraction less than one.

8. A non-transitory machine readable medium storing instructions for limiting data transmission to, from, or to and from a communication device that, when executed by one or more processors of said communication device, cause said communication device to:

display a graphical user interface (GUI), said GUI comprising one or more GUI controls for selecting first and second data transmission limiting tactics from a plurality of distinct data transmission limiting tactics and for specifying first and second data transmission thresholds at which the selected first and second data transmission limiting tactics respectively are to take effect, both of said first and second data transmission thresholds being below an operative data transmission cap, said data transmission cap representing a maximum amount of data that can be transmitted to, from, or to and from said communication device during a subscriber billing cycle without incurring a penalty under a subscriber rate plan, wherein said first and second data transmission limiting tactics are distinct and wherein said first and second data transmission thresholds are also distinct;

by way of said one or more GUI controls, receive user input indicating the selected first and second data transmission tactics and the specified first and second data transmission thresholds; and based on said user input, configure said communication device or another electronic device in communication therewith to effect the selected first data transmission limiting tactic when the specified first data transmission threshold is reached and configure said communication device or said other electronic device in communication therewith to effect the second data transmission limiting tactic, in addition to said first data transmission limiting tactic that is already in effect, when the second data transmission threshold is reached, so as to cause data transmission to be automatically and progressively limited through a progressive increase in the number of distinct data transmission limiting tactics that are in effect, even absent user awareness of a current data transmission tally, as the data transmission cap is approached, wherein each of the plurality, of data transmission limiting tactics charges at least one setting at the communication device to reduce the data transmitted to, from, or to and from the communication device said plurality of data transmission limiting tactics includes two or more of:
- reducing a size of chunks into which an electronic message exceeding a threshold size is subdivided for individual on-demand transmission to or from said communication device;
- reducing a size of a body of an electronic message prior to its transmission to or from said communication device by changing a format of said electronic message from a hypertext markup language (HTML) format to a non-markup language textual format;
- transmitting only a header portion of an electronic message to or from said communication device;
- transmitting data to or from said communication device not over a primary transmission medium to which said data transmission cap is applicable, but over a secondary transmission medium to which said data transmission cap is not applicable; and
- configuring a browser at said communication device to refrain from requesting images within browsed documents; and wherein, when the second data transmission limiting tactic is effected, non-emergency data transmission to and from the communication device is not stopped.

9. The non-transitory machine-readable medium of claim 8 wherein said communication device is a wireless communication device, said primary transmission medium is a wireless transmission medium, and said secondary transmission medium is a wired transmission medium.

10. The non-transitory machine readable medium of claim 8 wherein said first and second data transmission thresholds are each expressed within said GUI as a relative amount of the operative data transmission cap, said relative amount being a percentage less than 100% or a fraction less than one.

11. The non-transitory machine readable medium of claim 8 wherein either said first data transmission limiting tactic or said second data transmission limiting tactic comprises transmitting data to or from said communication device not over a primary transmission medium to which said data transmission cap is applicable, but over a secondary transmission medium to which said data transmission cap is not applicable.

12. A non-transitory machine readable medium storing instructions for limiting data transmission to, from, or to and from a communication device that, when executed by one or more processors of said communication device, cause said communication device to:
- display a graphical user interface (GUI), said GUI comprising one or more GUI controls for selecting first and second data transmission limiting tactics from a plurality of distinct data transmission limiting tactics and for specifying first and second data transmission thresholds at which the selected first and second data transmission limiting tactics respectively are to take effect, both of said first and second data transmission thresholds being below an operative data transmission cap, said data transmission cap representing a maximum amount of data that can be transmitted to, from, or to and from said communication device during a subscriber billing cycle without incurring a penalty under a subscriber rate plan, wherein said first and second data transmission limiting tactics are distinct and wherein said first and second data transmission thresholds are also distinct;
- by way of said one or more GUI controls, receive user input indicating the selected first and second data transmission tactics and the specified first and second data transmission thresholds; and
- based on said user input, configure said communication device or another electronic device in communication therewith to effect the selected first data transmission limiting tactic when the specified first data transmission threshold is reached and configure said communication device or said other electronic device in communication therewith to effect the second data transmission limiting tactic, in addition to said first data transmission limiting tactic that is already in effect, when the second data transmission threshold is reached, so as to cause data transmission to be automatically and progressively limited through a progressive increase in the number of distinct data transmission limiting tactics that are in effect, even absent user awareness of a current data transmission tally, as the data transmission cap is approached;

wherein each of the plurality of data transmission limiting tactics changes at least one setting at the communication device to reduce the data transmitted to, from, or to and from the communication device; and wherein, when the second data transmission limiting tactic is effected, non-emergency data transmission to and from the communication device is not stopped.

13. The non-transitory machine readable medium of claim 12 wherein said first and second data transmission thresholds are each expressed within said GUI as a relative amount of the operative data transmission cap.

14. The non-transitory machine readable medium of claim 13 wherein said relative amount is a percentage less than 100% or a fraction less than one.

15. A communication device comprising:
- at least one processor; and
- memory interconnected with said at least one processor storing instructions for limiting data transmission to, from, or to and from said communication device that, when executed by said processor, cause said communication device to:
  - display a graphical user interface (GUI), said GUI comprising one or more GUI controls for selecting first and second data transmission limiting tactics from a plurality of distinct data transmission limiting tactics and for specifying first and second data transmission thresholds at which the selected first and second data transmission limiting tactics respectively are to take effect, said data transmission threshold being below an operative data transmission cap, said data transmission cap representing a maximum amount of data that can be transmitted to, from, or to and from said communication device during a subscriber billing cycle without incurring a penalty under a subscriber rate plan, wherein said first and second data transmission limiting tactics are distinct and wherein said first and second data transmission thresholds are also distinct;
- by way of said one or more GUI controls, receive user input indicating the selected first and second data transmission tactics and the specified data first and second transmission thresholds;
- based on said user input, configure said communication device or another electronic device in communication therewith to effect the selected first data transmission limiting tactic when the specified first data transmission threshold is reached and configuring said communication device or said other electronic device in communication therewith to effect the second data transmission limiting tactic, in addition to said first data transmission limiting tactic that is already in effect, when the second data transmission threshold is reached, so as to cause data transmission to be automatically and progressively limited through a progressive increase in the number of distinct data transmission limiting tactics that are in effect, even absent user awareness of a current data transmission tally, as the data transmission cap is approached;

wherein each of the plurality of data transmission limiting tactics changes at least one setting at the communication device to reduce the data transmitted to, from, or to and from the communication device; and wherein, when the second data transmission limiting tactic is effected, non-emergency data transmission to and from the communication device is not stopped.

16. The communication device of claim 15 wherein said first and second data transmission thresholds are each expressed within said GUI as a relative amount of the operative data transmission cap.

17. The communication device of claim 16 wherein said relative amount is a percentage less than 100% or a fraction less than one.

18. A communication device comprising:

at least one processor; and memory interconnected with said at least one processor storing instructions for limiting data transmission to, from, or to and from said communication device that, when executed by said processor, cause said communication device to:

display a graphical user interface (GUI), said GUI comprising one or more GUI controls for selecting first and second data transmission limiting tactics from a plurality of distinct data transmission limiting tactics and for specifying first and second data transmission thresholds at which the selected first and second data transmission limiting tactics respectively are to take effect, both of said first and second data transmission thresholds being below an operative data transmission cap, said data transmission cap representing a maximum amount of data that can be transmitted to, from, or to and from said communication device during a subscriber billing cycle without incurring a penalty under a subscriber rate plan, wherein said first and second data transmission limiting tactics are distinct and wherein said first and second data transmission thresholds are also distinct;

by way of said one or more GUI controls, receive user input indicating the selected first and second data transmission tactics and the specified data first and second transmission thresholds; and based on said user input, configure said communication device or another electronic device in communication therewith to effect the selected first data transmission limiting tactic when the specified first data transmission threshold is reached and configuring said communication device or said other electronic device in communication therewith to effect the second data transmission limiting tactic, in addition to said first data transmission limiting tactic that is already in effect, when the second data transmission threshold is reached, so as to cause data transmission to be automatically and progressively limited through a progressive increase in the number of distinct data transmission limiting tactics that are in effect, even absent user awareness of a current data transmission tally, as the data transmission cap is approached, wherein each of the plurality of data transmission limiting tactics changes at least one setting at the communication device to reduce the data transmitted to, from, or to and from the communication device, said plurality of data transmission limiting tactics includes two or more of:

reducing a size of chunks into which an electronic message exceeding a threshold size is subdivided for individual on-demand transmission to or from said communication device;

reducing a size of a body of an electronic message prior to its transmission to or from said communication device by changing a format of said electronic message from a hypertext markup language (HTML) format to a non-markup language textual format;

transmitting only a header portion of an electronic message to or from said communication device;

transmitting data to or from said communication device not over a primary transmission medium to which said data transmission cap is applicable, but over a secondary transmission medium to which said data transmission cap is not applicable; and configuring a browser at said communication device to refrain from requesting images within browsed documents; and wherein, when the second data transmission limiting tactic is effected, non-emergency data transmission to and from the communication device is not stopped.

19. The communication device of claim 18 wherein said communication device is a wireless communication device, said primary transmission medium is a wireless transmission medium, and said secondary transmission medium is a wired transmission medium.

20. The communication device of claim 18 wherein said first and second data transmission thresholds are each expressed within said GUI as a relative amount of the operative data transmission cap, said relative amount being a percentage less than 100% or a fraction less than one.

* * * * *